US011550169B2

(12) United States Patent
Barrau et al.

(10) Patent No.: US 11,550,169 B2
(45) Date of Patent: Jan. 10, 2023

(54) ACTIVE OPTICAL FILTER FOR SPECTACLE LENSES

(71) Applicant: Essilor International, Charenton-le-Pont (FR)

(72) Inventors: Coralie Barrau, Charenton-le-Pont (FR); Thierry Villette, Charenton-le-Pont (FR); Jean-Paul Cano, Charenton-le-Pont (FR); Samuel Archambeau, Charenton-le-Pont (FR); Claudine Biver, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 111 days.

(21) Appl. No.: 16/918,077

(22) Filed: Jul. 1, 2020

(65) Prior Publication Data

US 2020/0333633 A1    Oct. 22, 2020

Related U.S. Application Data

(62) Division of application No. 15/753,726, filed as application No. PCT/EP2016/069452 on Aug. 16, 2016, now Pat. No. 10,725,322.

(30) Foreign Application Priority Data

Aug. 21, 2015   (EP) .................................... 15306302

(51) Int. Cl.
*G02C 7/10*   (2006.01)
*G02B 5/20*   (2006.01)
(Continued)

(52) U.S. Cl.
CPC ............. *G02C 7/104* (2013.01); *G02B 5/203* (2013.01); *G02C 7/101* (2013.01); *G03H 1/0244* (2013.01);
(Continued)

(58) Field of Classification Search
CPC ........ G02C 7/104; G02C 7/101; G02B 5/203; G03H 1/0244
(Continued)

(56) References Cited

U.S. PATENT DOCUMENTS

2002/0130988 A1   9/2002   Crawford et al.
2005/0162575 A1   7/2005   Harvic
(Continued)

FOREIGN PATENT DOCUMENTS

CN         1383025 A      12/2002
CN       202275248 U       6/2012
(Continued)

OTHER PUBLICATIONS

Combined Chinese Office Action and Search Report dated Jul. 27, 2020 in Chinese Patent Application No. 201680047469.5 (with English translation), 14 pages.
(Continued)

*Primary Examiner* — James R Greece
(74) *Attorney, Agent, or Firm* — Oblon, McClelland, Maier & Neustadt, L.L.P.

(57) ABSTRACT

Active optical filter adapted for a spectacle lens, the active optical filter being configured so as to filter light radiations over at least one predetermined range of wavelengths, wherein the full width at half maximum of the filtering function of the optical filter is smaller than or equal to 100 nm.

14 Claims, 3 Drawing Sheets

(51) Int. Cl.
*G03H 1/02* (2006.01)
*G02F 1/137* (2006.01)

(52) U.S. Cl.
CPC .......... *G02C 7/108* (2013.01); *G02F 1/13718* (2013.01); *G02F 1/13725* (2013.01); *G02F 1/13793* (2021.01); *G03H 2250/38* (2013.01)

(58) Field of Classification Search
USPC .................................................. 351/159.65
See application file for complete search history.

(56) References Cited

U.S. PATENT DOCUMENTS

| | | |
|---|---|---|
| 2006/0092374 A1 | 5/2006 | Ishak |
| 2008/0221674 A1* | 9/2008 | Blum ..................... G02C 7/108 623/5.11 |
| 2008/0310031 A1* | 12/2008 | Mohr ....................... G01J 3/12 359/666 |
| 2011/0164215 A1 | 7/2011 | Coco Martin et al. |
| 2013/0278989 A1 | 10/2013 | Lam et al. |
| 2014/0055736 A1 | 2/2014 | Ishak |
| 2014/0320806 A1 | 10/2014 | Cohen-Tannoudji et al. |
| 2016/0085131 A1 | 3/2016 | Lam et al. |

FOREIGN PATENT DOCUMENTS

| | | |
|---|---|---|
| CN | 102998850 A | 3/2013 |
| CN | 103003739 A | 3/2013 |
| JP | 2002-268080 A | 9/2002 |
| WO | 02/057841 A2 | 7/2002 |
| WO | 2007/075520 A2 | 7/2007 |
| WO | 2 317 368 A1 | 5/2011 |
| WO | 2012/079159 A1 | 6/2012 |
| WO | 2013/082176 A2 | 6/2013 |
| WO | 2013/084176 A1 | 6/2013 |
| WO | 2016/107813 A1 | 7/2016 |
| WO | 2016/107866 A1 | 7/2016 |

OTHER PUBLICATIONS

International Search Report and Written Opinion dated Nov. 24, 2016, in PCT/EP2016/069452 filed Aug. 16, 2016.
Office Action dated Oct. 11, 2021 in corresponding Chinese Patent Application No. 201680047469.8 (with English Translation), 11 pages.

\* cited by examiner

ACTIVE OPTICAL FILTER FOR SPECTACLE LENSES

CROSS-REFERENCE TO RELATED APPLICATIONS

This application is a divisional application of, and claims the benefit of priority under 35 U.S.C. § 120 from U.S. application Ser. No. 15/753,726, filed Feb. 20, 2018, herein incorporated by reference, which claims the benefit of priority under 35 U.S.C. § 119 from Europe Patent Application No. 15306302.9, filed Aug. 21, 2015.

FIELD OF THE INVENTION

The invention relates to an active optical filter for a spectacle lens configured to filter light optical radiations over a predetermined range of wavelengths.

BACKGROUND OF THE INVENTION

During life, individuals have their eyes cumulatively exposed to harmful light (UV, blue light). Solar lenses protect the eyes from the harmful effects of natural light but a prolonged wearing might in particular affect the optimal regulation of circadian rhythms. Besides, sunglasses are not systematically worn outdoors, particularly in the winter, fall and spring and thus no photo-protection is provided during that time.

There is a need to provide an optical filter, other than a sunglass, that filters a maximum of the potentially harmful wavelengths while (i) ensuring a proper regulation of circadian rhythms, (ii) maintaining visual comfort, in particular for color discrimination and scotopic vision, and (iii) providing an acceptable aesthetics, for any user profile and for a permanent wear.

Existing passive filters can partially modulate the spectrum of light received by the eye. All these solutions have drawbacks:

First, the residual color (due to the filter in the visible range) is constant, and can be very pronounced for strong levels of filtering and/or broad rejected spectral ranges. For example, with a high level of blue-violet light filtering, the residual color is yellow and can significantly degrade the aesthetics of the filter lens, making it less comfortable for the wearer.

Secondly, the filter being passive, the spectral filtering functions cannot be activated at the most appropriate times. For a convenient photo-synchronization of circadian rhythms, filtering is required only for limited periods, at specific hours, and depends on the user's profile (shift workers, teenagers . . . ).

Therefore, an object of the present invention is to provide an optical filter that does not present the above identified drawbacks.

In particular there is a need for active and selective band stop filters in any range of optical wavelengths (UV, visible, IR . . . ).

SUMMARY OF THE INVENTION

To this end, the invention proposes an active optical filter adapted for a spectacle lens, the active optical filter being configured so as to filter light radiations over at least one predetermined range of wavelengths, wherein the full width at half maximum of the filtering function of the optical filter is smaller than or equal to 100 nm.

Advantageously, the device according to the invention allows filtering one or more bands of wavelengths only when required or recommended. When the filtering function is not activated, the device does not present any annoying residual color.

Several devices of this type can of course be added to a spectacle lens, each of which can be activated independently. Two devices in parallel can for example be combined to provide a band stop effect at two distinct bands of wavelengths.

According to further embodiments which can be considered alone or in combination:
  the central wavelength of the filtering function is greater than or equal to 400 nm and smaller than or equal to 500 nm; and/or
  the central wavelength of the filtering function is greater than or equal to 410 nm and smaller than or equal to 460 nm; and/or
  the active filter is configured so as to filter light radiations over at least a second predetermined range of wavelengths, wherein the full width at half maximum of the filtering function of the optical filter is smaller than or equal to 100 nm; and/or
  the active filter is further configured so as to allow shifting the central wavelength of the filtering function between a first value, to a second value, for example in the range of 540 nm to 590 nm; and/or
  the active filter is further configured so as to allow shifting the filtering function between a first range of wavelengths to a second range of wavelengths,
  the active filter comprises at least one cell comprising a transparent material between two transparent supports and at least two transparent electrodes, the transparent material being chosen so that at least one optical property of said transparent material over the predetermined range of wavelengths changes upon application of an electrical field between the transparent supports using the at least two transparent electrodes; and/or
  the optical property of the transparent material that changes upon application of an electrical field is one of the reflectivity and the absorption over the predetermined range of wavelengths; and/or
  the active filter comprises at least one cell comprising a transparent material between two transparent supports and at least two transparent electrodes, the cell further comprises at least a first holographic grating on one of the inner surfaces of the transparent support, the first holographic grating being configured so as to reflect light radiations in the predetermined range of wavelengths for pre-determined incidence angles,
  wherein the refractive index of said transparent material changes upon application of an electrical field between the transparent supports using the at least two transparent electrodes from a first value substantially equal to the refractive index of the material used for the holographic grating to a second value different from the refractive index of the material used for the first holographic grating; and/or
  the transparent material comprises a liquid crystal material formulation whose refractive index changes upon application of an electrical field; and/or
  the cell further comprises a second holographic grating on the inner surface of the transparent support opposite to the one comprising the first holographic grating, the second holographic grating being configured so as to reflect light radiations in a range of wavelengths different from the one of the first holographic grating; and/or the cell further comprises a second holographic grating on the inner surface of the transparent support opposite to the one comprising the first holographic grating, the second holographic grating being made of a material having a refractive index different from the one used for the first holographic grating; and/or the active filter comprises at least one cell comprising a transparent liquid crystal formulation between two transparent supports and at least two transparent electrodes, the transparent liquid crystal formulation having a cholesteric phase with a pitch in the predetermined range of wavelengths to be filtered, the pitch of the cholesteric phase being controlled by the amount of chiral dopant in the liquid crystal formulation and by its helical twisting power and by the electrical field between the transparent supports using the at least two transparent electrodes; and/or the active filter comprises at least one cell comprising a transparent liquid crystal formulation between two transparent supports and at least two transparent electrodes, the transparent liquid crystal formulation is in a blue phase organization with a size of the cubic mesh in the predetermined range of wavelengths to be filtered, the blue phase organization being stabilized in the useful temperature range by a method known in the state of the art, the cubic mesh of the blue phase being controlled by the electrical field between the transparent supports using the at least two transparent electrodes; and/or the active filter comprises at least one cell comprising an transparent material between two transparent supports and at least two transparent electrode, the transparent material comprising at least a liquid crystal matrix whose orientation changes upon application of an electrical field and at least one dichroic dye having its absorption range in the predetermined range of wavelengths to be filtered; and/or the active filter comprises at least one cell comprising a transparent material between two transparent supports and at least two transparent electrodes, the transparent material comprising a transparent electrolyte with at least two dyes whose color changes with their oxidation states.

The invention further relates to a pair of spectacles comprising at least a pair of spectacle lenses mounted on a spectacle frame, wherein at least one of the spectacles lenses comprises an active filter according to any of the preceding claims.

According to a further aspect, the invention also relates to a method of controlling the active filter according to the invention.

The invention further relates to a computer program product comprising one or more stored sequences of instructions that are accessible to a processor and which, when executed by the processor, causes the processor to carry out the method according to the invention.

The invention also relates to a computer-readable storage medium having a program recorded thereon; where the program makes the computer execute the method of the invention.

The invention further relates to a device comprising a processor adapted to store one or more sequence of instructions and to carry out the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or they may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. Such computer readable storage medium may be embedded in a pair of spectacles according to the invention.

BRIEF DESCRIPTION OF THE DRAWINGS

Embodiments of the invention will now be described, by way of example only, and with reference to the following drawings in which:

FIGS. 3a, 3b, 4a, 4b, 51, 5b, 6a and 6b represent active filters according to different embodiments of the invention.

DETAILED DESCRIPTION OF PREFERRED EMBODIMENTS

The invention relates to an active optical filter adapted for a spectacle lens, for example an ophthalmic lens. The active optical filter is configured so as to filter light radiations over at least one predetermined range of wavelengths. The full width at half maximum of the filtering function of the optical filter is smaller than or equal to 100 nm.

Figure 1:
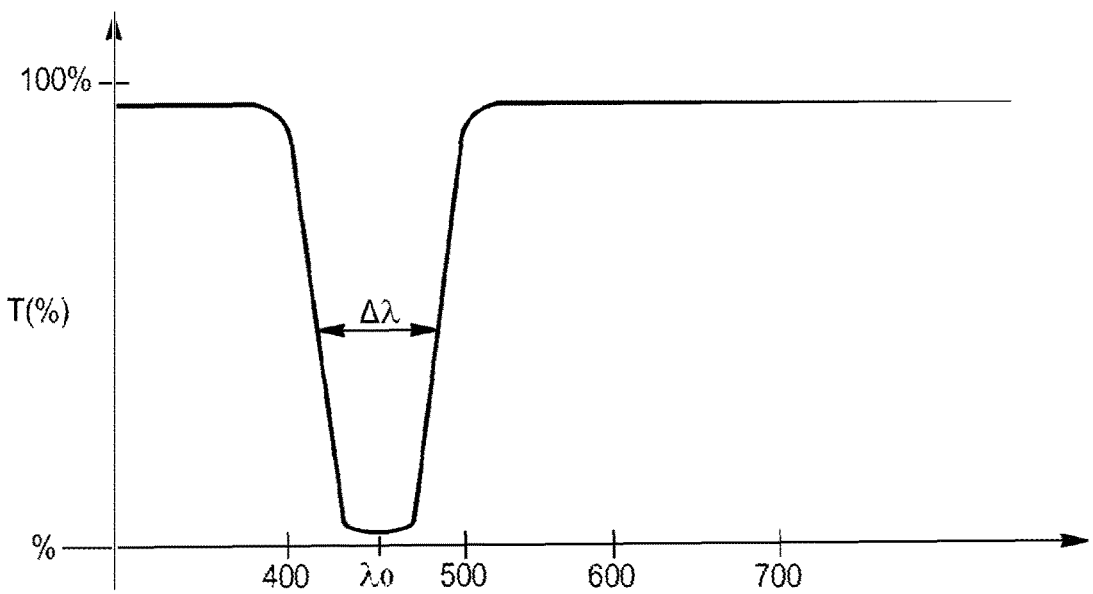
FIG. 1 is an example of a transmission pattern of an active filter according to the invention.

FIG. 1, is a schematic representation of an example of transmission pattern of an active optical filter according to the invention when activated.

As illustrated on FIG. 1, an active optical filter according to the invention has a transmission pattern comprising at least a first, second and third zone Z1, Z2, Z3.

In the example of FIG. 1, the first zone Z extends from 400 nm, for example 400 nm, to a first limit L1 between the first zone Z1 and the second zone Z2.

The third zone Z3 extending from a second limit L2 between the second zone Z2 and the third zone Z3 to 780 nm, for example 700 nm.

The average transmission values T1, T2, T3, in each zone Z1, Z2, Z3 are such as:

$$T2 < (T1+T3)/2, \text{ with}$$

T1 the average transmission over the first zone Z1,
T2 the average transmission over the second zone Z2,
T3 the average transmission over the third zone Z3, T1 and T3 being greater than or equal to 80%, and T2 being smaller than or equal to 60%.

In the sense of the invention, the "average transmission" over a zone corresponds to average the percentage of light transmitted by the optical system over the corresponding range of wavelengths.

In other words, an average transmission of 80% over the first zone corresponds to 80% of the incident light between 400 nm and L being transmitted through the optical system.

According to a preferred embodiment, the average transmission T2 over the second zone Z2 is preferably smaller than or equal to 40%, most preferably smaller than or equal to 20%.

The full width at half maximum Δλ of the filtering function of the optical filter according to the invention is smaller than or equal to 100 nm. Advantageously, the optical filter can be used to stop a narrow band of light.

To reduce the blue light-induced risk for the retina, the optical filter according to the invention may be fitted to have the second zone Z2 extend between 415 nm and 455 nm.

The active optical filter according to the invention may be configured to filter turquoise blue between 465 nm and 495 nm for active synchronization of the circadian clock. Such embodiment is particularly advantageous for users suffering from a sleep related disorder such as insomnia, jet lag, DSPS, ASPS gold or for shift workers.

In an embodiment, the active filter is further configured so as to allow shifting the filtering function between a first range of wavelengths to a second range of wavelengths.

In an example, the active filter is configured to shift the filtering function between the range 415 nm-460 nm to the range 465 nm-495 nm.

In another example, the active filter is configured to shift the filtering function between two ranges of wavelengths comprised in the range 540 nm to 590 nm.

The active optical filter may further be configured to filter light radiations between 560 nm and 600 nm for the treatment or prevention of photo-induced epileptic seizures.

The active optical filter may also be configured to filter in the IR range for potential reduction of dry eye effects.

The active optical filter may also be configured to filter optical radiations between 540 nm and 590 nm, preferably between 560 nm and 580 nm where the sensitivity spectra of the long-wavelength cones (L cones) and of the medium-wavelength cones (M cones) cross over, in the Parvo chromatic retinal pathway. The filtering function may significantly reduce the color confusion between green and red ranges, making the colors more saturated or purer.

The active optical filter may be advantageously used for colorblind patients, by partially or totally filtering out a spectral band centered on one of the sensitivity maxima of the cone photoreceptors, depending on the colorblind type and severity. For a strong red-green disability axis, an adapted filtering profile could eliminate wavelengths at around 520-530 nm, i.e. the maximum sensitivity of the M-cones (or green cones). This filtering answer may induce a contrast difference for the colorblind patient, making it possible to distinguish spatial distributions of red and green within a viewed scene. Depending on the spatial distribution of green versus red colors, the filtering function may be activated, thanks to a front sensor, such as a camera for a complete spatial and spectral analysis of the scene.

According to an embodiment, the active filter is further configured so as to allow shifting the central wavelength of the filtering function between a first value, to a second value, for example in the range of 540 nm to 590 nm.

Adjusting the central wavelength depending on the user and his activity allows to minimize the color area of confusion (ie cut at the intersection of M and L cones photoreceptors).

For example, the user of the active optical filter may operate the shift of the central wavelength of the filtering function by acting of the electrical field between the at least two electrodes of the active filter.

In the embodiment below, the reflected color of the blue phase can be switched to another one by applying an electrical field on the polymer-stabilized device. By interacting with the local dielectric anisotropy of the blue phase, a moderate electrical field can reversibly induce a red shift of the rejected color of the filter.

Although in FIG. 1 the active optical filter is illustrated to filter out only one range of wavelengths, the active optical filter of the invention is not limited to one filtered spectral range.

According to an embodiment of the invention, the optical filter is configured so as to filter light radiations over at least a second predetermined range of wavelengths, wherein the full width at half maximum of the filtering function of the optical filter is smaller than or equal to 100 nm.

Figure 2:
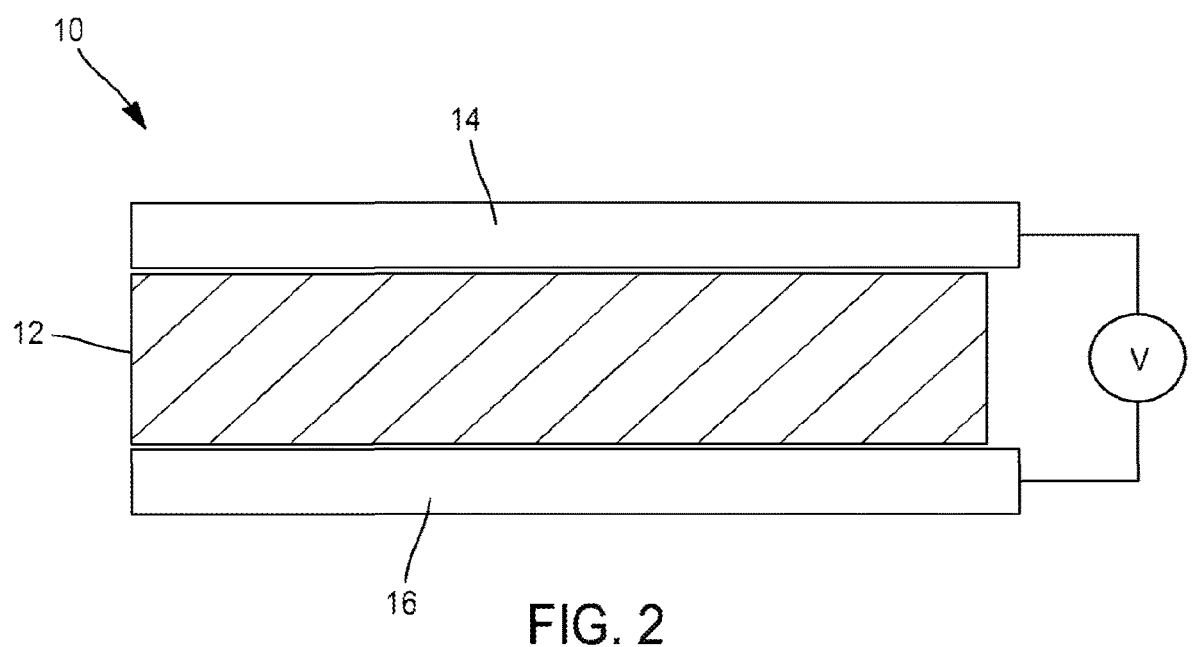
FIG. 2 illustrates an active filter according to the invention.

As illustrated on FIG. 2, an active filter 10 according to the invention may comprise at least one cell comprising a transparent material 12 between two transparent supports 14 and 16.

In such embodiment, the transparent material 12 by itself may have transmission pattern as represented on FIG. 1.

At least one of the transparent supports 14, 16, for example both of the transparent supports, comprises at least one transparent electrode, the transparent material being chosen so that at least one optical property of said transparent material over the predetermined range of wavelengths changes upon application of an electrical field between the transparent supports using the at least one transparent electrode.

The optical property of the transparent material that changes upon application of an electrical field may be one of the reflectivity and the absorption over the predetermined bandwidth of wavelengths.

A solution to implement an active optical filter according to the invention is to match or not the refractive index of a surface hologram with a liquid crystal formulation.

The orientation of the liquid crystals in the formulation changes upon application of an electric field and hence the refractive index seen by the light passing through the filter changes.

Figure 3A:
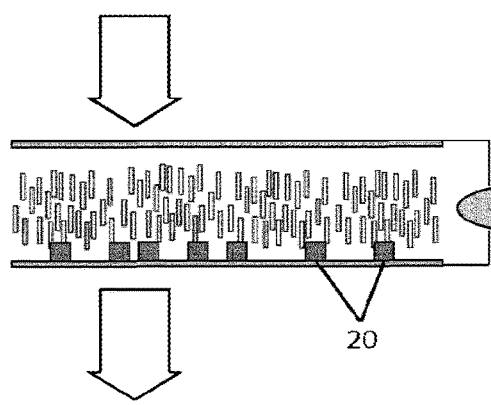
Figure 3B:
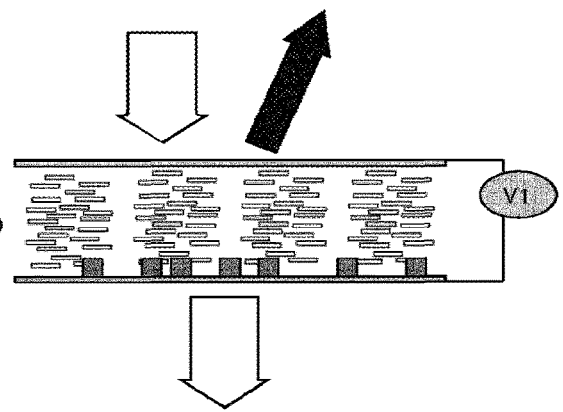

As illustrated on FIG. 3, the cell comprises at least a first holographic grating 20 on one of the inner surfaces of the transparent support. The first holographic grating 20 is configured so as to reflect light radiations in the predetermined range of wavelengths.

The refractive index of the transparent material changes upon application of an electrical field between the transparent supports using the at least one transparent electrode from a first value substantially equal to the refractive index of the material used for the holographic grating to a second value different from the refractive index of the material used for the first holographic grating.

When the refractive index of the liquid crystal formulation (as seen by the light passing through the filter) is equal to that of the material used for the holographic grating, the reflecting effect of the filter "disappears". In other words, the cell is substantially transparent even over the predetermined range of wavelengths to be filtered.

When the refractive index of the liquid crystal formulation (as seen by the light passing through the filter) is different from that of the material used for the holographic grating, the reflecting effect of holographic grating 20 "appears" for the predetermined range of wavelengths.

Therefore, by controlling the orientation and hence the optical index of the liquid crystal formulation comprised in the cell, one may control the filtering property of the cell. Using a holographic grating 20 as a reflecting element provides a narrow full width at half maximum of the filtering function, for example the full width at half maximum of the filtering function may be of about 20 nm.

According to a further embodiment, the cell may further comprises a second holographic grating on the inner surface of the transparent support opposite to the one comprising the first holographic grating, the second holographic grating being configured so as to reflect light radiations in a range of wavelengths identical or different from the one of the first holographic grating.

Advantageously, such configuration allows having a double band-stop filter that may filter light radiations over two distinct bandwidths.

So as to be able to alliteratively filter the two distinct bandwidths, the second holographic grating may be made of a material having a refractive index different from the one used for the first holographic grating.

Advantageously the optical filter may be switched from one range of wavelengths to the other by changing the refractive index of the transparent materiel between the two transparent supports.

Figure 4A:
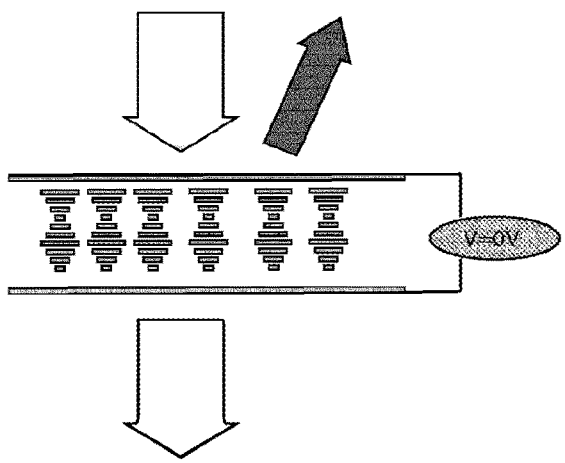
Figure 4B:
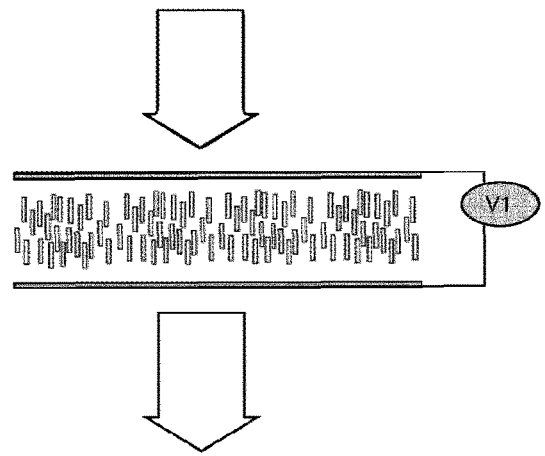

According to a further embodiment of the invention illustrated on FIGS. 4a and 4b, the active filter comprises at least one cell comprising a transparent liquid crystal formulation between two transparent supports, at least one of the transparent supports comprises a transparent electrode. The transparent liquid crystal formulation has a cholesteric phase with a pitch in the predetermined bandwidth of wavelengths to be filtered, the pitch of the cholesteric phase being controlled by the amount of chiral dopant introduced in the formulation and by its helical twisting power and by an electrical field between the transparent supports using the at least one transparent electrode.

Cholesteric liquid crystals are also known as chiral nematic liquid crystals. They are organized in layers with no positional ordering within layers, but a director axis which varies with layers. The variation of the director axis tends to be periodic in nature. The period of this variation, i.e. the distance over which a full rotation of 3600 is completed, is known as the pitch, p. This pitch determines the wavelength of light which is reflected (Bragg reflection).

When applying an electrical field between the two transparent supports, the orientation of the liquid crystals changes and allows for example to move from a state where the cholesteric liquid crystals reflect the desired wavelengths to a state where they are oriented differently and do not reflect anymore or are oriented identically and increase light reflection.

The electrodes may be configured to have the orientation of liquid crystals change in a desired area of the optical surface of an ophthalmic lens. This area can be determined using a light sensor placed on the spectacle frame and that detects the direction and/or wavelength of the incident light. The light sensor may be configured to be active only above a given amount of received luminous flux such as light intensity or light brightness. For example for steady fixation of very small sources (viewing angle less than 11 mrad)—ICNIRP limits for blue-light hazards—:

for t=0 to 10000 s, limit: (10 mJ/cm$^2$)/t,
for t>10000 s, limit: 1 µW/cm$^2$
For daylight, limit: 1 mW/cm$^2$.

Figures 5A, 5B:
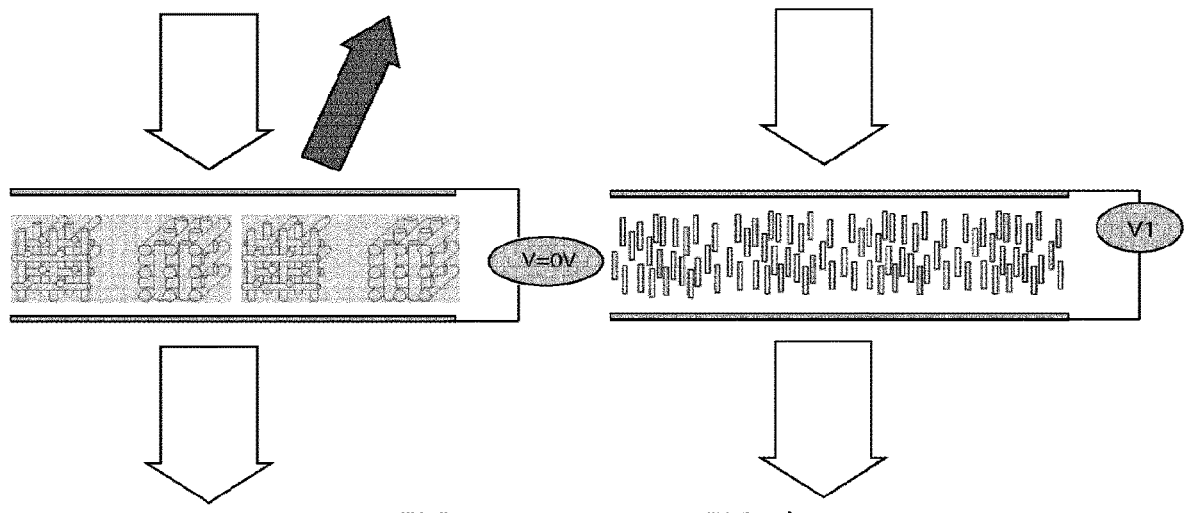

As illustrated on FIG. 5, according to an embodiment, the transparent liquid crystal formulation placed between the two transparent supports may be in a blue phase organization with a size of the cubic mesh in the predetermined range of wavelengths to be filtered. The blue phase organisation has to be stabilised in the useful range of temperature by a method known from the state of the art. The cubic mesh of the blue phase may be controlled by the electrical field between the transparent supports using the at least one transparent electrode.

Figures 6A, 6B:
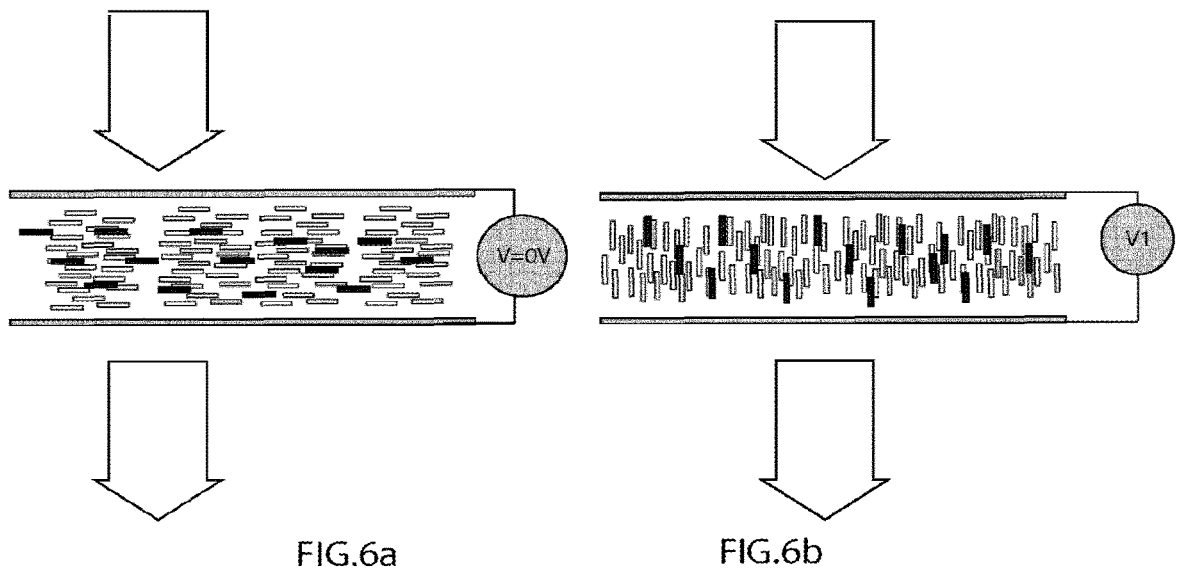

As illustrated on FIG. 6, the transparent material placed between the two transparent supports may comprise at least a liquid crystal matrix whose orientation changes upon application of an electrical field and at least one dichroic dye having its absorption range in the predetermined range of wavelengths to be filtered.

The dichroic dyes are chosen to have an absorption spectrum in the area of desired wavelengths. Once incorporated in the liquid crystal matrix they provide an absorbing effect.

According to a further embodiment, the transparent material comprised between the two transparent supports may comprise a transparent electrolyte with at least two dyes whose color changes with their oxidation states.

These dyes can color or discolor in an electrolyte comprising a salt, under the effect of an electrical current. For this system the two dyes are used, one in reduction state, the other in oxidation state. One of the dyes can be transparent in both states, such as thianthren, and the other may have an appropriate spectrum in one of its states, for example from a transparent to yellow as the 5,10-dihydrophenazine.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An active optical filter adapted for a spectacle lens, comprising:
    at least one cell including a transparent material between two transparent supports and at least two transparent electrodes, the transparent material comprising a transparent electrolyte with at least two dyes whose color changes with their oxidation states,
    wherein the active optical filter being configured to filter light radiations over at least one predetermined range of wavelengths,
    wherein the full width at half maximum of the filtering function of the optical filter is smaller than or equal to 100 nm, and
    wherein one of the at least two dyes is made of thianthren.

2. The active filter according to claim 1, wherein the central wavelength of the filtering function is greater than or equal to 400 nm and smaller than or equal to 500 nm.

3. The active filter according to claim 2, wherein the central wavelength of the filtering function is greater than or equal to 410 nm and smaller than or equal to 460 nm.

4. The active filter according to claim 1, wherein the filter is configured to filter light radiations over at least a second predetermined range of wavelengths, wherein the full width at half maximum of the filtering function of the optical filter is smaller than or equal to 100 nm.

5. The active filter according to claim 1, wherein the active filter is further configured so as to allow shifting the central wavelength of the filtering function between a first value, to a second value, for example in the range of 540 nm to 590 nm.

6. The active filter according to claim 1, wherein the active filter is further configured to allow shifting the filtering function between a first range of wavelengths to a second range of wavelengths.

7. The active filter according to claim 1, comprising at least one cell comprising a transparent material between two transparent supports and at least two a transparent electrodes, the cell further comprises at least a first holographic grating on one of inner surfaces of the transparent support, the first holographic grating being configured to reflect light radiations in the predetermined range of wavelengths,
wherein the refractive index of said transparent material changes upon application of an electrical field between the transparent supports using the at least two transparent electrodes from a first value substantially equal to the refractive index of the material used for the holographic grating to a second value different from the refractive index of the material used for the first holographic grating.

8. The active filter according to claim 7, wherein the transparent material comprises a liquid crystal material formulation whose refractive index changes upon application of an electrical field.

9. The active filter according to claim 7, wherein the cell further comprises a second holographic grating on the inner surface of the transparent support opposite to the one inner surface comprising the first holographic grating, the second holographic grating being configured to reflect light radiations in a range of wavelengths different from the one of the first holographic grating.

10. The active filter according to claim 7, wherein the cell further comprises a second holographic grating on an inner surface of the transparent support opposite to the one inner surface comprising the first holographic grating, the second holographic grating being made of a material having a refractive index different from a material used for the first holographic grating.

11. The active filter according to claim 1, wherein the active filter comprises at least one cell comprising a transparent liquid crystal formulation between two transparent supports and at least two transparent electrodes, the transparent liquid crystal formulation having a cholesteric phase with a pitch in the predetermined range of wavelengths to be filtered, the pitch of the cholesteric phase being controlled by the electrical field between the transparent supports using the at least two transparent electrodes.

12. The active filter according to claim 1, wherein the active filter comprises at least one cell comprising a transparent liquid crystal formulation between two transparent supports and at least two transparent electrodes, the transparent liquid crystal formulation in a blue phase organization with a size of the cubic mesh in the predetermined range of wavelengths to be filtered, the cubic mesh of the blue phase being controlled by the electrical field between the transparent supports using the at least two transparent electrodes.

13. The active filter according to claim 1, wherein the active filter comprises at least one cell comprising an transparent material between two transparent supports, at least one of the transparent supports comprises a transparent electrode, the transparent material comprising at least a liquid crystal matrix whose orientation changes upon application of an electrical field and at least one dichroic dye having its absorption range in the predetermined range of wavelengths to be filtered.

14. A pair of spectacles comprising at least a pair of spectacle lenses mounted on a spectacle frame, wherein at least one of the spectacles lenses comprises an active filter according to claim 1.

* * * * *